United States Patent [19]

Ueno et al.

[11] Patent Number: 5,395,173
[45] Date of Patent: Mar. 7, 1995

[54] BAR CODE AND TEXT PRINTER CAPABLE OF DISPLAYING BAR CODE LOCATION

[75] Inventors: Hideo Ueno; Akihiro Sawada, both of Nagoya; Chitoshi Ito, Kasugai, all of Japan

[73] Assignee: Brother Kogyo Kabushiki Kaisha, Nagoya, Japan

[21] Appl. No.: 249,065

[22] Filed: May 25, 1994

Related U.S. Application Data

[63] Continuation of Ser. No. 997,167, Dec. 28, 1992, abandoned.

[30] Foreign Application Priority Data

Dec. 28, 1991 [JP] Japan ................... 3-360470

[51] Int. Cl.$^6$ ............................................. B41J 3/46
[52] U.S. Cl. ........................................ 400/103; 400/83
[58] Field of Search .................... 400/83, 103, 104

[56] References Cited

U.S. PATENT DOCUMENTS

| | | | |
|---|---|---|---|
| 4,641,347 | 2/1987 | Clark et al. | 400/104 |
| 4,746,932 | 5/1988 | Sato | 400/103 |
| 4,829,568 | 5/1989 | Clark et al. | 400/104 |
| 4,840,499 | 6/1989 | Sasaki et al. | 400/83 |
| 5,025,397 | 6/1991 | Suzuki | 400/104 |
| 5,184,900 | 2/1993 | Eisner | 400/104 |
| 5,188,464 | 2/1993 | Aaron | 400/103 |
| 5,294,202 | 3/1994 | Sawada et al. | 400/103 |

FOREIGN PATENT DOCUMENTS

| | | | |
|---|---|---|---|
| 0228708 | 5/1989 | European Pat. Off. | 400/103 |
| 0364305 | 4/1990 | European Pat. Off. | 400/615.2 |
| 61-883 | 1/1986 | Japan | 400/103 |
| 61-130068 | 6/1986 | Japan | 400/103 |
| 2228811A | 1/1990 | United Kingdom | 400/103 |

OTHER PUBLICATIONS

Bobart and Flurry, "Bar Code Printing for Improved Reliability"–IBM Technical Disclosure Bulletin, vol. 24, No. 8, Jan. 1982, pp. 4326–4330.

Primary Examiner—David A. Wiecking
Assistant Examiner—Steven S. Kelley
Attorney, Agent, or Firm—Oliff & Berridge

[57] ABSTRACT

A bar code printer capable of printing bar codes simultaneously with character strings made of, for example, alphanumeric characters. Operating a bar code key causes a bar code input display to appear on a display and the bar code start code to be stored in a bar code buffer. Then operating a number key causes a number code representing the number to be stored in the bar code buffer and a dot pattern representing the number code to be output to a video RAM. Operating an execution key while a 13 digit number code is stored in the bar code buffer will additionally cause an end code to be stored in the bar code buffer and the resultant code string to be stored in a text memory.

34 Claims, 13 Drawing Sheets

BAR CODE AND TEXT PRINTER CAPABLE OF DISPLAYING BAR CODE LOCATION

This is a continuation of Application Ser. No. 07/997,167, filed Dec. 28, 1992, now abandoned.

BACKGROUND OF THE INVENTION

1. Field of the Invention

The present invention relates to a bar code printer, and more particularly to the bar code printer being capable of printing both bar codes and desired character strings.

2. Description of the Related Art

There have been proposed bar code printers that print bar codes representing a diversity of merchandise. Such bar codes are in wide use as a method of source marking by using the Japan Article Number (JAN) in Japan and Universal Product Code (UPC) in U.S. Ordinarily bar codes are printed using specially designed printers which use print elements that form the bay codes in dot print patterns.

Recently, managing large book stocks in libraries, and large stocks of magnetic medium (magnetic tapes, floppy disks and the like the use of which has increased rapidly with the popularization of office automation), has been performed using computers. Attaching bar codes, printed on the specially designed printers mentioned above, to magnetic media or books, and reading the bar codes with a bar code scanner attached to a computer has been quite helpful in the management of these items. However there has been a problem with conventional bar code printers in that they can only print bar codes. To magnetic media and books with the bar codes attached are usually also attached strings of characters, for example alphanumeric characters, which people can read without using special equipment. However, because conventional bar code printers can only print bar codes, a separate printer is required for printing strings of characters, requiring the purchase of both a bar code printer and a character string printer.

SUMMARY OF THE INVENTION

In view of the above, it is an object of the present invention to provide a bar code printer which can print both bar codes and desired character strings in desired locations, thereby enhancing usability of the bar codes.

To achieve the above and other objects, there is provided a bar code printer for printing bar codes, which comprises (a) input means for inputting data, the data including at least code data representative of each of a plurality of characters and each of a plurality of symbols, (b) storage means for storing the data input through said input means, and (c) converting means for converting the data read from said storage means into dot pattern data.

In accordance with another aspect of the invention, there is provided a printer for carrying out printing on an elongated web-like tape, which comprises (a) input means for inputting at least alphanumeral characters and bar code data, (b) storage means for storing the alphanumereal characters and the bar code data input through said input means, (c) reading means for sequentially reading data stored in said storage means in an order that the alphanumeral characters and the bar code data are inputted, (d) converting means for converting the data read from said storage means into dot pattern data, and (e) printing means for printing the dot pattern data on the elongated, web-like tape.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Referring to the accompanying drawings, a preferred embodiment of the invention will be described.

The preferred embodiment describes the present invention as a tape printer specializing in printing alphanumeric characters and other characters used in English text. It should be noted that the present invention can also be used for printing other characters such as Japanese kanji, katakana, and hiragana.

Figure 1:
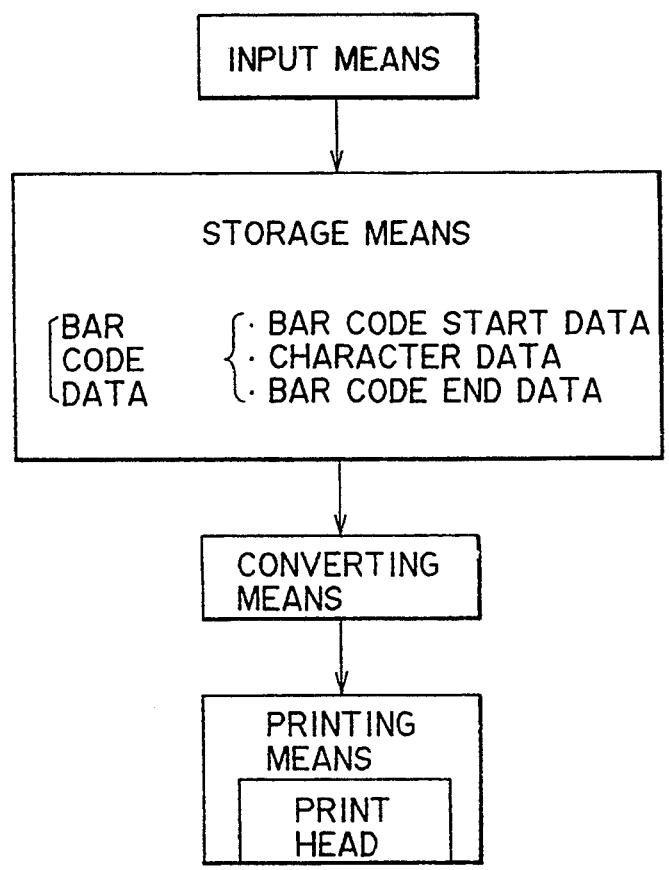
FIG. 1 is a functional block diagram showing construction of a bar code printer made according to the present invention.
Figure 2:
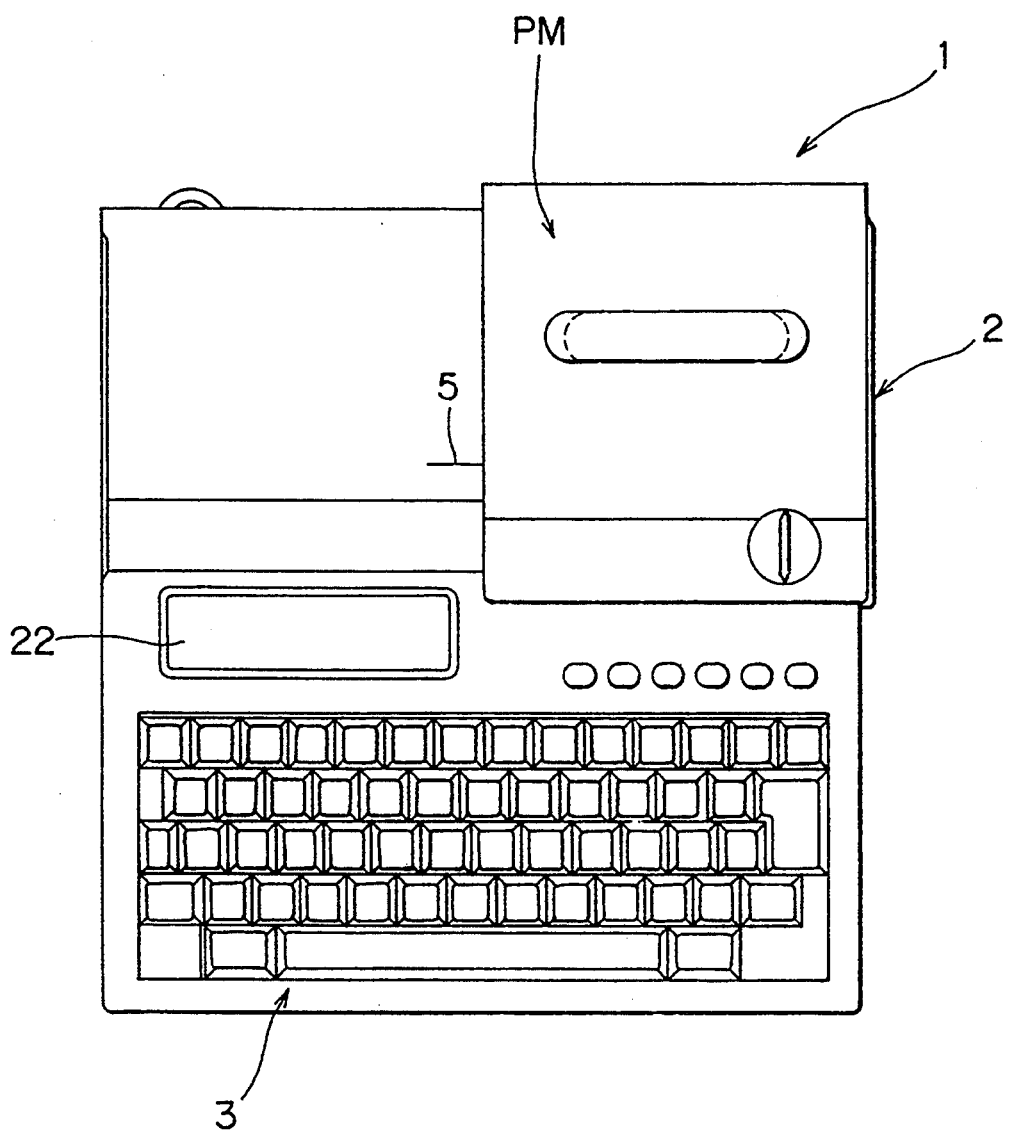
FIG. 2 is a top view of a bar code printer in which a first embodiment of the present invention can be practiced.

As can be seen in FIG. 2, the tape printer 1 includes a body frame 2 within which is installed a printing mechanism PM. At the front end of the body frame 2 is a keyboard 3. Behind the keyboard 3 is an LCD (liquid crystal display) 4 capable of displaying characters or symbols.

The keyboard 3 includes character keys for entering numbers, symbols, and alphabetical characters (hereinafter numbers, symbols and alphabetical characters will be referred to as "characters"), a space key, cursor keys for moving a cursor horizontally or vertically across the LCD, a backspace key for deleting the character to the immediate left of the curser, a return key for starting a new line of character strings, a size key for setting the size of which characters are printed, a bar code keys for inputting bar code data, a print key for carrying out printing, an execution key for storing bar code data into a text memory, and a power switch for turning the power ON and OFF.

Figure 3:
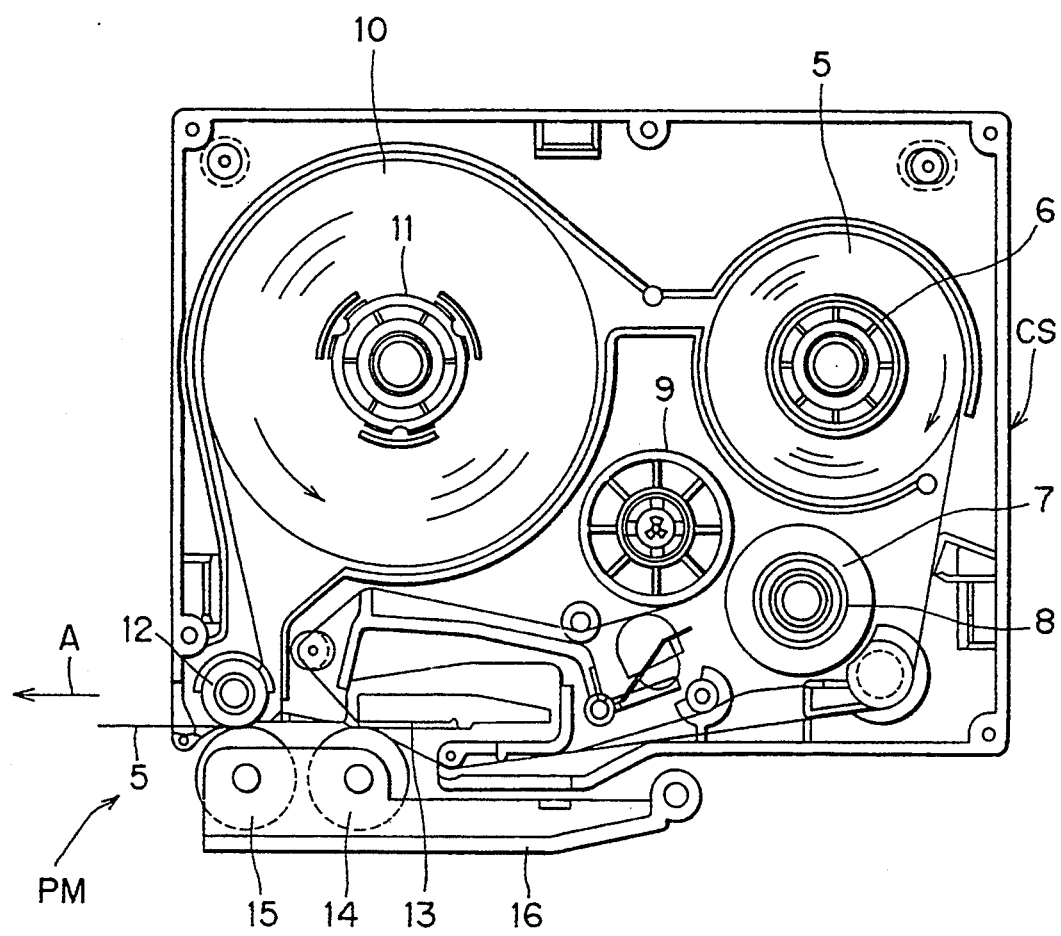
FIG. 3 is a schematic plan view of a printing mechanism in the FIG. 1 bar code printer.

Referring to FIG. 3, the printing mechanism PM will now be briefly described. In the body frame 2 is installed a freely detachable rectangular tape cassette CS. The tape cassette CS contains a tape spool 6 around which is wound a printing tape 5 made of transparent film about 24 mm wide, a ribbon feed spool 8 around which is wound an ink ribbon 7, a take-up spool 9 for taking up (receiving) used ink ribbon, a feed spool 11 around which is wound a double-sided adhesive tape 10, having the same width as the printing tape 5, so its releasable sheet faces outward, and a bonding roller 12 for bonding the printing tape 5 to the double-sided adhesive tape 10. The roller 12 and spools 6, 8, 9, and 11 are all rotatably furnished in cassette CS.

A thermal head 13 is located where the printing tape 5 and the ink ribbon 7 overlap each other. A platen roller 14 presses the printing tape 5 and the ink ribbon 7 against the thermal head 13. A feed roller 15 presses the printing tape 5 (which now contains characters) and double-sided adhesive tape 10 against the bonding roller 12. The platen roller 14 and the feed roller 15 are rotatably supported by a support assembly 16. The thermal head 13 contains 128 heating elements arranged vertically to extend across the tape width.

In operation, the bonding roller 12 and the take-up spool 9 are driven in synchronism with each other in their respective directions by a tape feed motor 24 while heating elements are energized, causing a plurality of dot columns (dot strings) to form on the printing tape 9 as printed characters thereon. The printing tape 5 with the double-sided adhesive tape 10 adhered thereto is fed in the direction of arrow A out of the body frame 2. For a more detailed description of the printing mechanism PM refer to Japanese Laid-open Patent Publication No. 2-106555.

Figure 4:
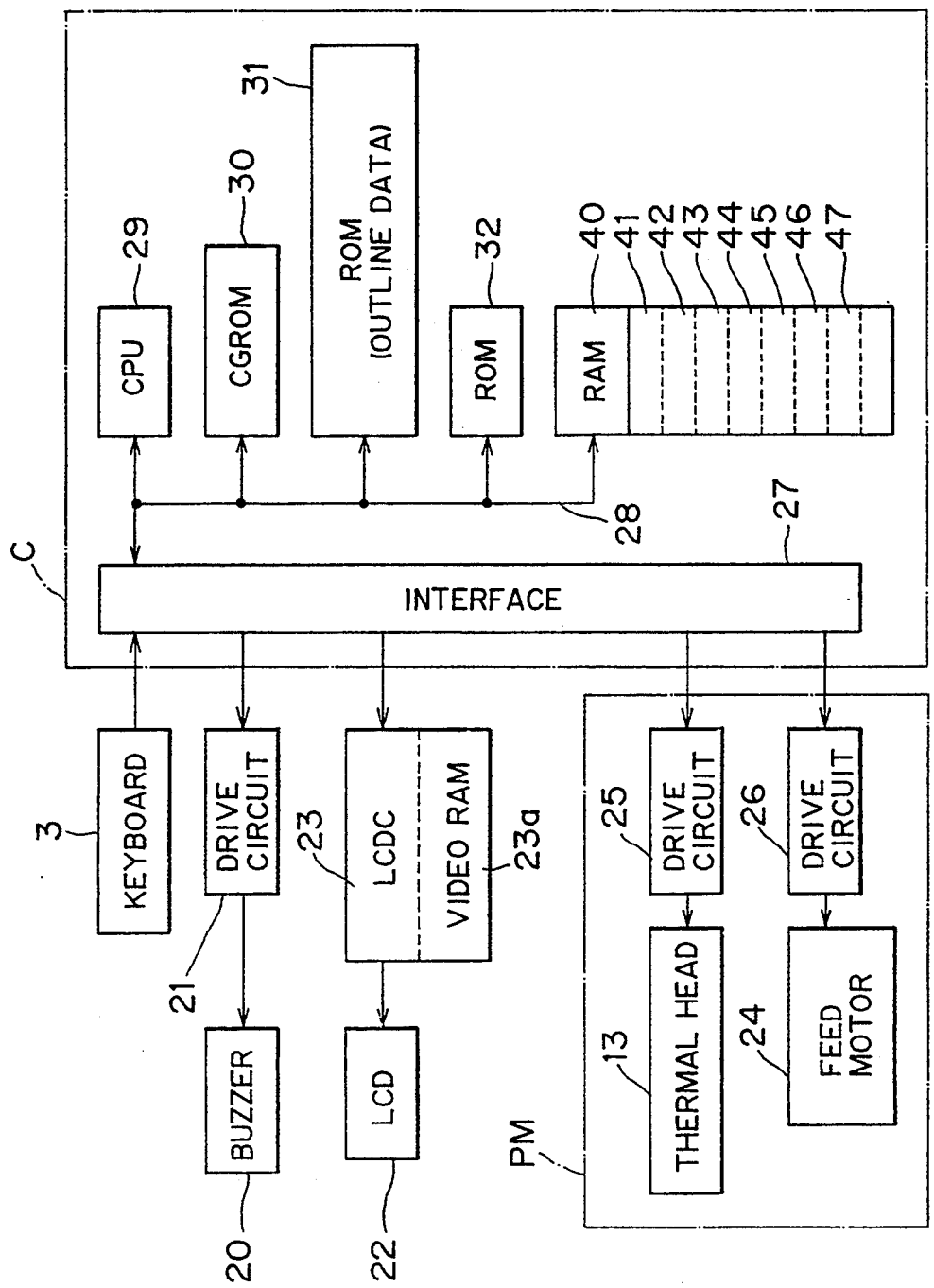
FIG. 4 is a block diagram of a control system for use with the FIG. 1 bar code printer in which the embodiment of the present invention is practiced.

The control system of the tape printer 1 is constructed as shown in the block diagram in FIG. 4. A controller C has an interface 27 to which are connected the keyboard 3, an LCD controller (liquid crystal display controller) 23 possessing a video RAM 23a for controlling the LCD 22, a thermal head drive circuit 25 for driving the thermal head 13, a feed motor drive circuit 26 for driving the feed motor 24, and a buzzer drive circuit 21 for driving a warning buzzer 20. The thermal head drive circuit 25 and the feed motor drive circuit 26 are installed in the printing mechanism PM.

The controller C includes a CPU (central processing unit) 29, the interface 27 connected to the CPU 29 via bus 28, a character generator ROM 30, a ROM 31 (with outline data), a ROM 32, and a RAM 40.

The character generator ROM (pattern data memory) 30 stores dot pattern data for each of the plurality of characters for displaying characters on the LCD 22. The character generator ROM 30 stores the dot pattern data in association with code data representative of each character.

The ROM (outline data memory) 31 stores outline data representative of the outline of each of the plurality of characters. The outline data are categorized by font (e.g. gothic, elite and so on) and stored in the ROM 31 in association with code data.

The ROM 32 stores programs and subroutines such as a display drive control program for controlling the display controller 23 in accordance with code data for characters input at the keyboard 3, an image developing process control program for converting outline data into dot patterns data and developing the dot pattern in the print buffer 46, a print drive control program for sequentially reading data from the print buffer 46 and driving the tape feed motor 24 and the thermal head 13, and a tape print control program for controlling tape printing operations. The tape print control program is a special feature of the present invention and will be explained later in detail. The tape print control program includes a data converting subroutine for converting data characters composed of a 13 digit number stored in the text memory 41 into bar code data.

In the data converting subroutine, the 13 digit number data which include data characters (11 digit number) and a modular check character (one digit number) are converted to standard version bar code data based on JAN (Japan Article Number) standards. More specifically, bar code data are converted to 3 modules for a left guard bar, 42 modules for the leftside six data characters, 5 modules for a center bar, 35 modules for the rightside five data character, 7 modules for the one modular check character, and 3 modules for the right guard bar.

The RAM 40 includes a text memory 41, a text pointer 42, a display pointer 43, a character size memory 44, a bar code buffer 45, a print buffer 46, and a print pointer. The text memory 41 stores bar code data, text data, and other data that is input from the key board. The text pointer 42 (the contents of which will be referred to as the text pointer value TP, hereinafter) stores one address from the text memory 41. The display pointer 43 (the contents of which will be referred to as the display pointer value DP, hereinafter) stores the address in the text memory 41 which represents the extreme left character of the fixed number character string displayed on the LCD 22. The character size memory 44 stores data designating size at which characters are set for printing. The bar code buffer 45 stores data characters, made up of 13 digit numbers for printing bar codes. The print buffer 46 stores print data for bar codes and characters to be printed. The print pointer 47 (the contents of which will be referred to as the print pointer value PP, hereinafter) stores the address of the text memory 41 for reading the code data for printing.

A description is now provided of how the controller C of the tape printer 1 executes a tape printing control routine, with reference to the flowcharts of FIGS. 5 through 8. In the figures, Si (i=1, 2, 3, ... ) indicates a step in the tape printing control routine.

Figure 5:
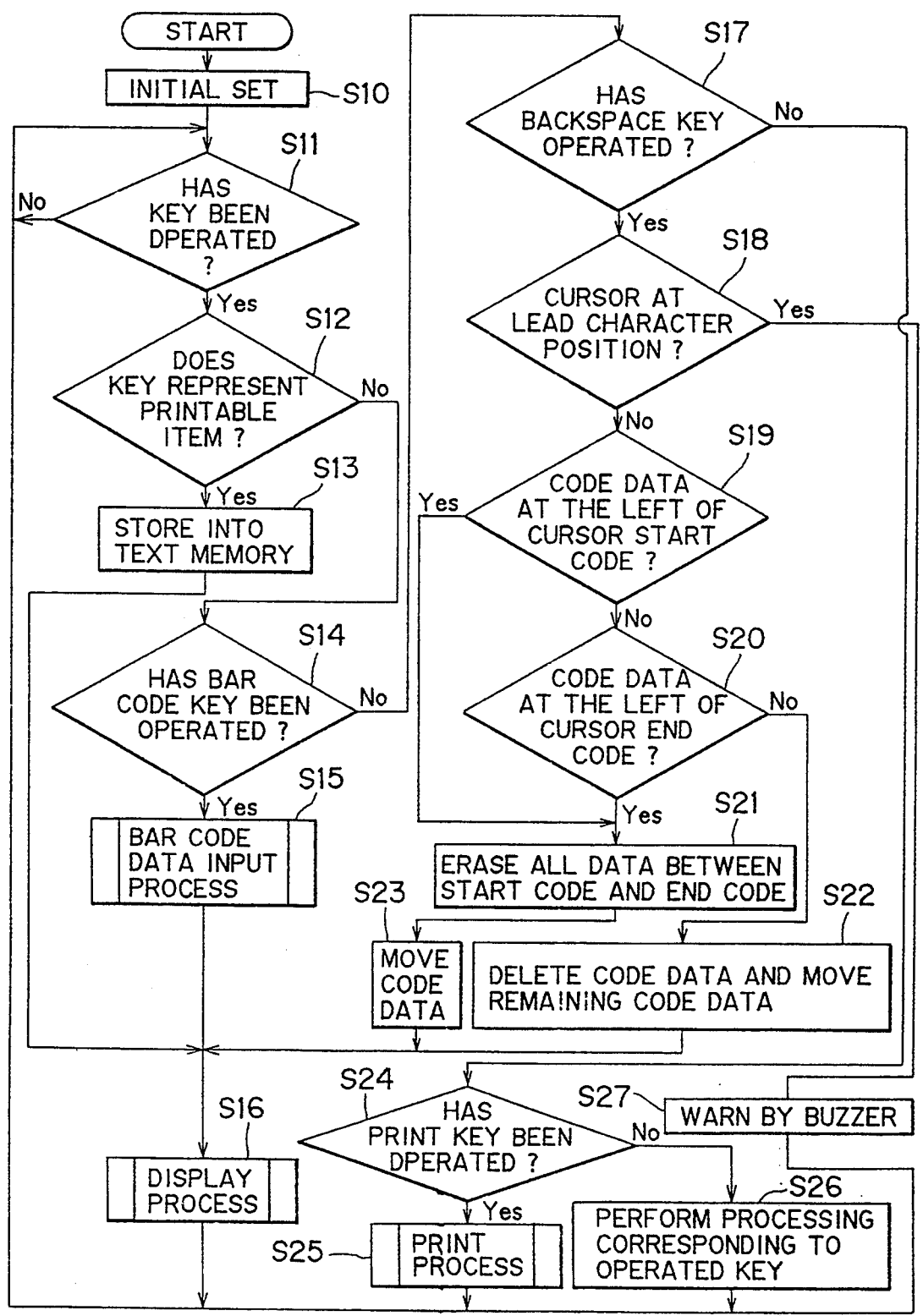
FIG. 5 is a flowchart outlining a tape printing control routine of the present invention.
Figure 9:
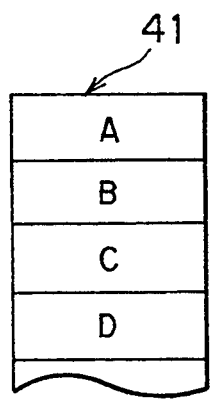
FIG. 9 is a schematic diagram showing dot pattern data in a text memory of the embodiment of the present invention.

Turning the power switch ON applies power to the tape printer 1 and starts the tape printing control routine shown in FIG. 5. Step S10 executes initial settings by clearing memories 41 through 47. Operating character keys, the space key or other keys which represent printable items (i.e., step S11 and step S12 are "yes") stores into the text memory 41 in step S13 the code data corresponding to the character represented by the operated key. Next, the character represented by the operated key is displayed on the LCD 22 in step S16 before the program returns to step S11. For example, when the keys for characters "A", "B", "C", and "D" are sequentially pressed, the code data for characters "ABCD" will be sequentially stored in the text memory 41 as shown in FIG. 9.

Figure 6:
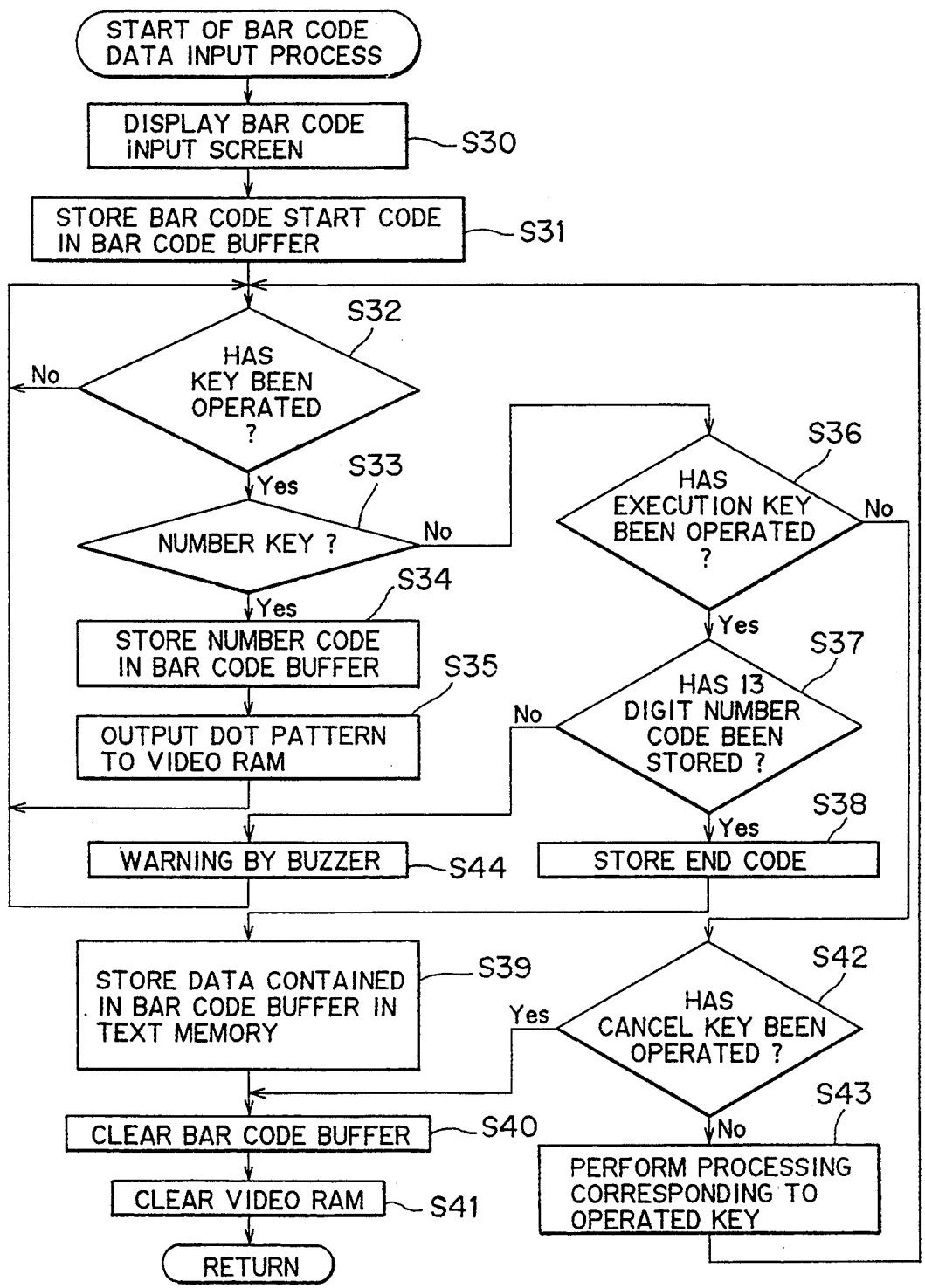
FIG. 6 is a flowchart outlining a bar code data input processing subroutine of the present invention.
Figure 10:
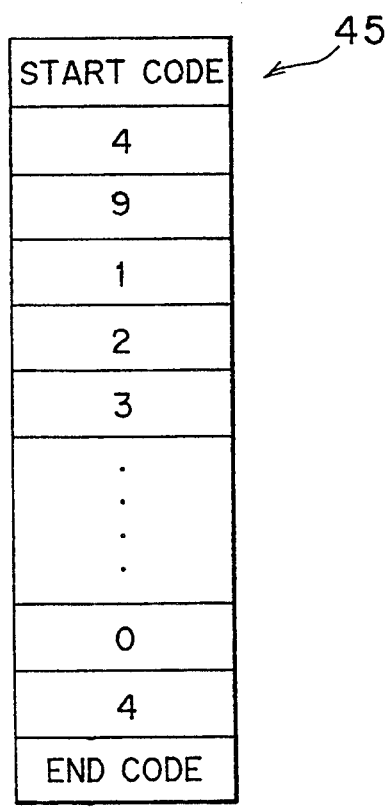
FIG. 10 is a schematic diagram showing data in a bar code buffer of the embodiment of the present invention.
Figure 13:
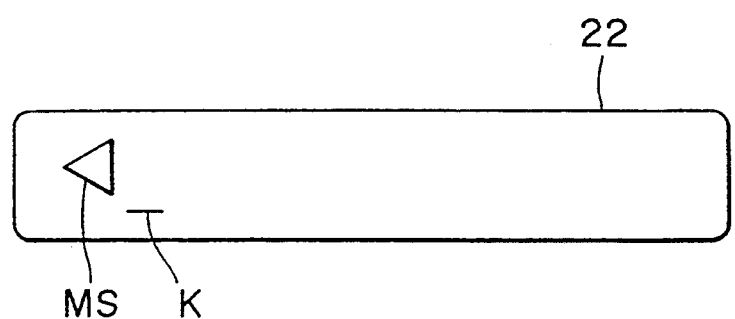
FIG. 13 is a schematic diagram showing a display of the embodiment of the present invention when bar code data are input.

When the bar code key is operated for printing a bar code (i.e., steps S11 and S14 are "yes" and step S12 is "no"), the bar code data input process shown in FIG. 6 is executed in step S15. When this process is initiated, the bar code input screen is displayed in step S30 and the bar code start code is stored in the bar code buffer in step S31. For example, a triangular start mark MS is displayed at the leftmost lead position of the cleared LCD 22 as shown in FIG. 13 where the symbol K represents the cursor, and the start code is stored at the lead address of the bar code buffer 45 as shown in FIG. 10.

Figure 14:
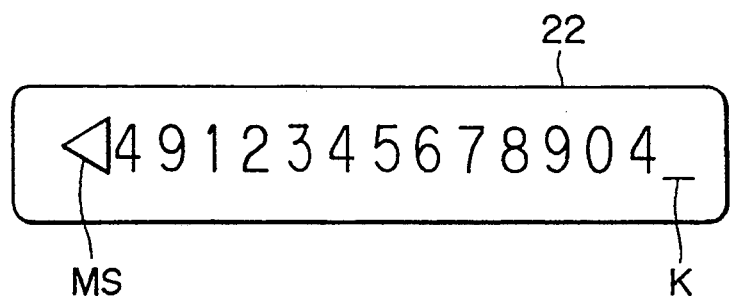
FIG. 14 is a schematic diagram showing the display of FIG. 13 with numbers which represent data characters displayed thereon.

When a number key is operated (i.e. steps S32 and S33 are "yes"), the number code representing the number of the key operated is stored in the bar code buffer 45 in step S34 and the dot pattern corresponding to the number code is read from the character generating ROM 30 and output to the video RAM 23a in step S35. The routine then returns to step S32. That is, when a 13 digit character, one digit being a prefix character, 11 digits being data characters, and one digit being a modular check character, representing bar code "4912345678904" is input, the 13 numbers of the number code are sequentially stored in the bar code buffer 45 as shown in FIG. 10 and displayed on the LCD 22 as shown in FIG. 14.

Figure 11:
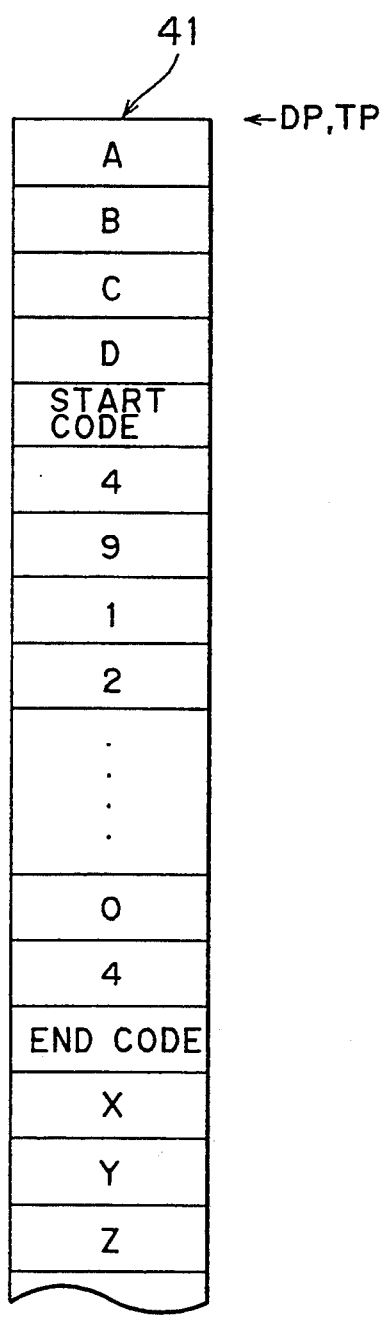
FIG. 11 is a schematic diagram showing the text memory of FIG. 9 with bar code data stored additionally therein.

If the 13 digit number code has been stored in the bar code buffer 45 (i.e., step S37 is "yes") when the execution key is operated, which indicates input of bar code data is complete, (i.e., steps S32 and S36 are "yes" and step S33 is "no"), the bar code end code is additionally stored in the bar code buffer in step S38. The entire code string stored in the bar code buffer 45 is stored in the text memory 41 in step S39, the bar code buffer is cleared in step S41, and the video RAM 23a is cleared in step S41, whereupon the bar code data input process ends. For example, the entire code string in the bar code buffer, as shown in FIG. 10, will be stored in the text memory 41, as shown in FIG. 11, and the LCD 22 will be cleared.

It is noted that when the cancel key is operated (i.e., steps S32 and S42 are "yes" and steps S33 and S36 are "no"), both the bar code buffer 45 and the video RAM 23a will clear in steps S40 and S41. If the 13 digit number code has not been stored in the bar code buffer 45 when the execution key is operated (i.e., step S37 is "no"), the warning buzzer 20 will sound in step S44.

Figure 7:
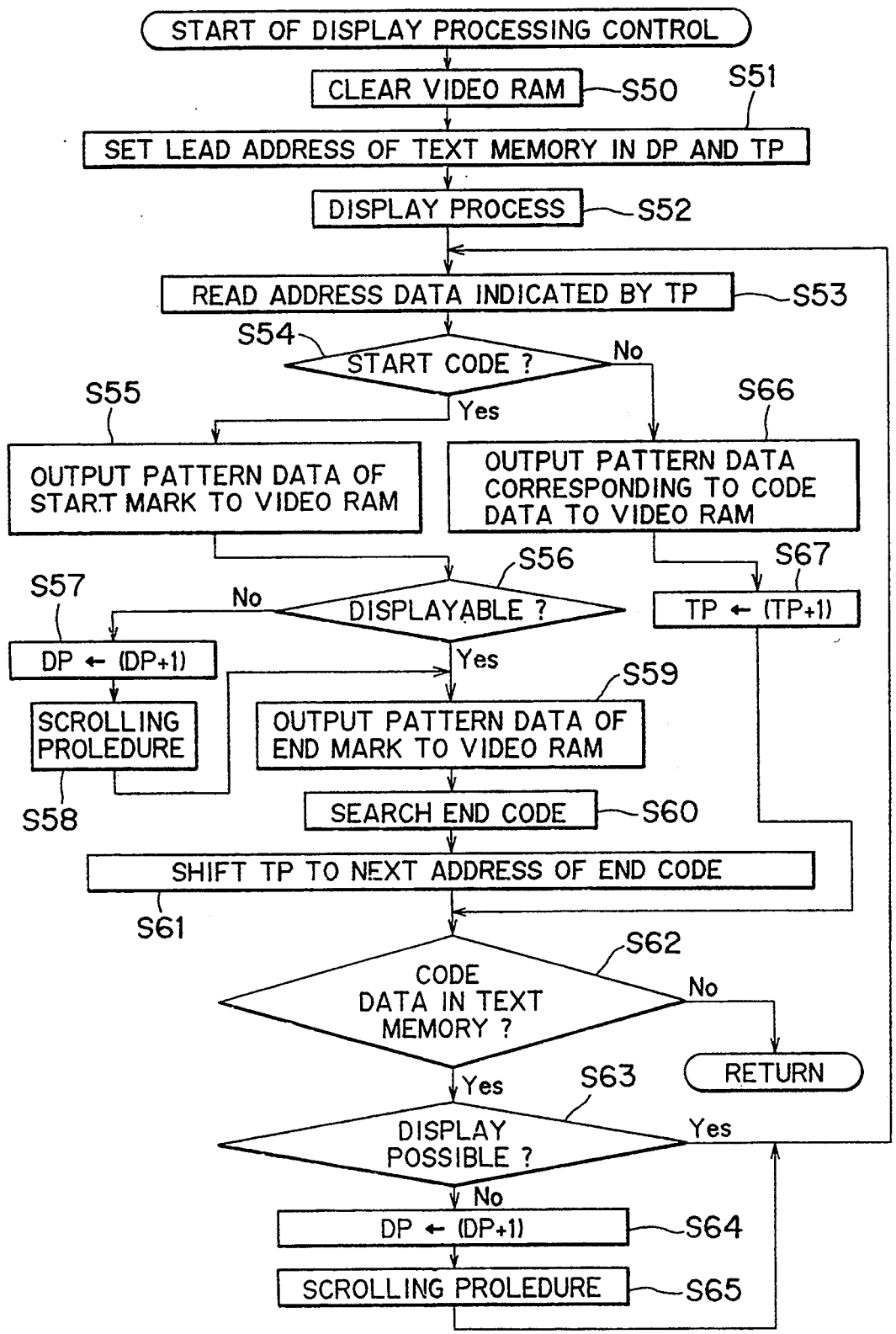
FIG. 7 is a flowchart outlining a display processing control subroutine of the present invention.

Next, a display processing control process will be described with reference to FIG. 7. The video RAM 23a is cleared in step S50, the lead address of the text memory 41 is set both in the display pointer value DP and the text pointer value TP in step S51. A predetermined number of characters are displayed on the display 22 based on the display pointer value DP in step S52. The address data indicated by the text pointer value TP is read in step S53. When the address data are not the bar code start code (i.e., step S54 is "no"), pattern data corresponding to the code data are read, output to the video RAM 23a, and displayed on the LCD 22 in step S66. One is added to the text pointer value TP in step S67, and when code data are in the text memory 41 (i.e., step S62 is "yes") and when display of more characters is possible, that is, the position indicated on the display by the cursor is not the last position on the LCD 22 (i.e., step S63 is "yes"), steps S53 et seq are repeated. When no more characters can be displayed (i.e., step S63 is "no"), one is added to the display pointer value DP in step S64 and a scrolling procedure is executed which moves all display data one digit's distance in the direction of the lead position in step S65. The routine then returns to step S53.

Figure 15:
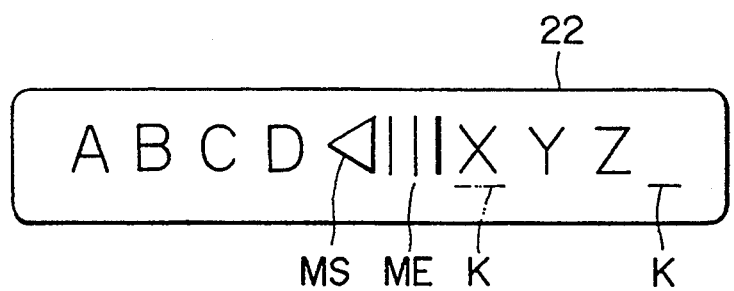
FIG. 15 is a schematic diagram showing the display of FIG. 13 with both character strings and bar codes displayed thereon.

On the other hand, when the address data indicated by the text pointer value TP is the bar code start code (i.e., step S54 is "yes"), the pattern data of the start mark MS, which corresponds to the start code, are output to the video RAM 23a in step S55. When more characters can be displayed (i.e., step S56 is "yes"), pattern data of the end mark ME, which corresponds to the end code, are output to the RAM 23a in step S59, the end code in the text memory 41 is searched in step S60, and the text pointer value TP is shifted to the next address of the end code in step S61, after which steps S62 and on are executed. When no further characters can be displayed (i.e., step S56 is "no") the scrolling procedure previously described for steps S64 and S65 is executed in steps S57 and S58. When no undisplayed data remain in the text memory 41 (i.e., step S62 is "no") the display control process ends and the program returns to step S11. That is, when the data shown in FIG. 11 are stored in the text memory 41, the character strings "ABCD" and "XYZ" are displayed as shown in FIG. 15 by execution of steps S53, S54, and S62 through 65, and the start mark MS and the end mark ME are displayed by execution of steps S53 through S65.

When the backspace key is operated (i.e., steps S11 and S17 are "yes" and steps S12 and S14 are "no") while the cursor K is at a position on the LCD 22 other than that corresponding to the lead character in the text memory 41 (i.e., step S18 is "no") and the code data at the left of the cursor K are neither start code nor the end code, that is, it is a character code (i.e., steps S19 and S20 are "no"), the code data to the left of the cursor K is deleted and the code data to the right of the deleted code data moves in the direction of the lead address in step S22 and the display process is executed in step S16.

Figure 12:
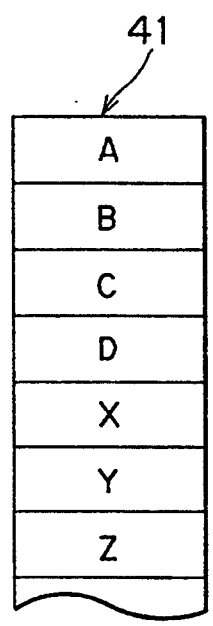
FIG. 12 is a schematic diagram showing the text memory of FIG. 9 with character string data stored therein.
Figure 16:
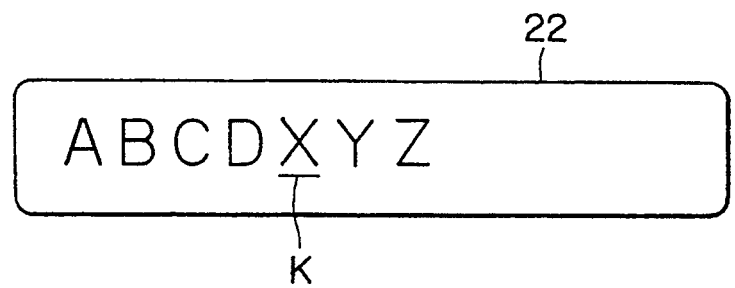
FIG. 16 is a schematic diagram showing the display of FIG. 13 with only character strings displayed thereon.

However, when the code data to the left of the cursor K is the start code (i.e., step S19 is "yes") or the end code (i.e., step S19 is "no" and step S20 is "yes"), all data between the start code and the end code are erased from the text memory 41 and the code data to the right of the erased bar code data moves in the direction of the lead address in step S23 and the display process is executed in step S16. That is, when the text memory 41 stores the data shown in FIG. 11 and the LCD 22 displays cursor K at the display position indicated in FIG. 15, operating the backspace key erases all bar code data from the text memory 41, from the start code to the end code inclusive, and coding for "XYZ" moves to the left leaving data as shown in FIG. 12. As a result, the LCD 22 displays only the character string "ABCDXYZ" as shown in FIG. 16.

When the next key operated is a key other than a character key, the print key, a bar code key, or the backspace key (i.e., step S11 is "yes" and steps S12, S14, S17, and S24 are "no"), the process appropriate for the key pressed is executed in step S26. Specifically, when the size key is operated for setting the character size, the size data are stored in the character size memory 44.

Figure 8:
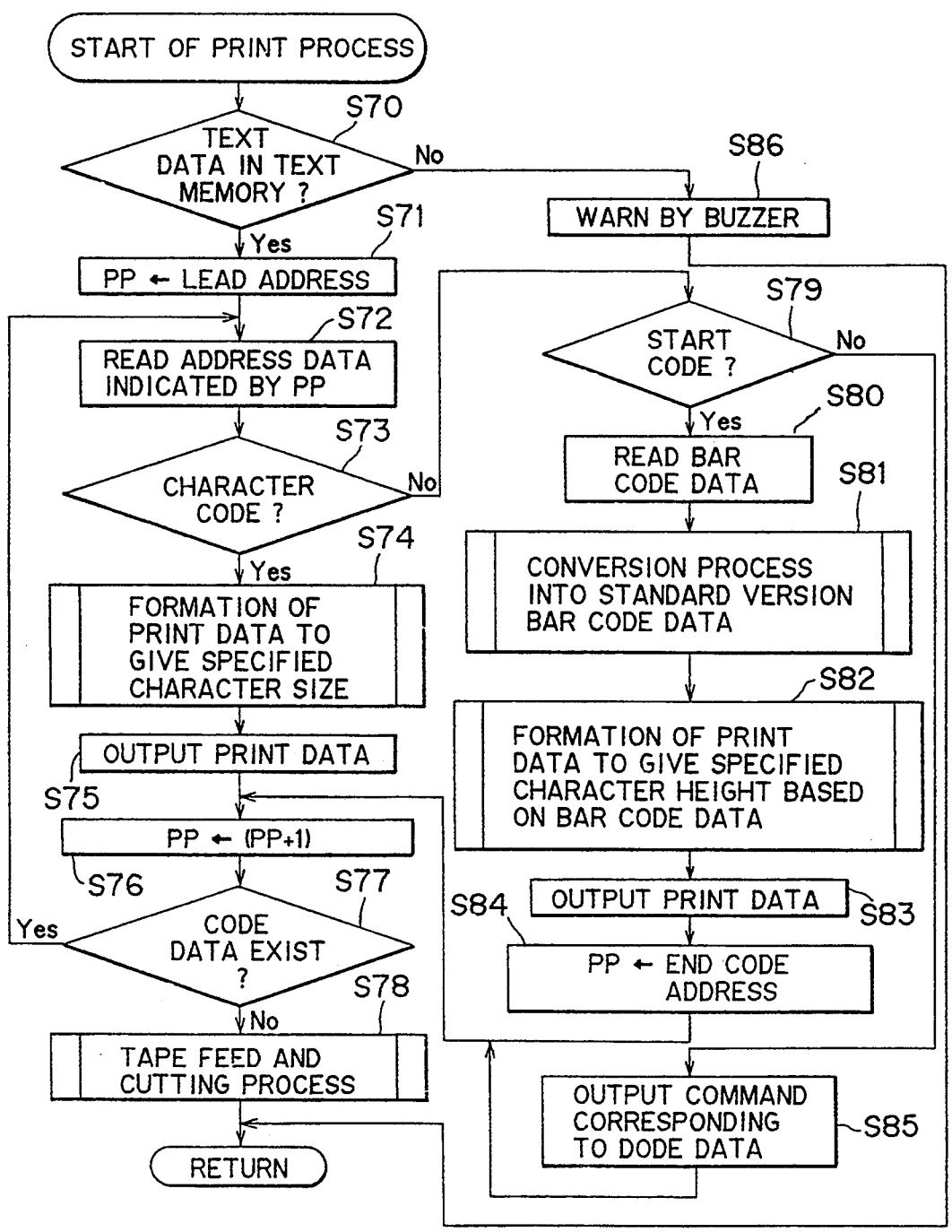
FIG. 8 is a flowchart outlining a print processing control subroutine of the present invention.

When the next key operated is the print key (i.e., steps S11 and S24 are "yes" and steps S12, S14, and S17 are "no"), in step S25, the print process shown in FIG. 8 is executed. After this process is started, if, in step S70, text data are determined as stored in the text memory 41, the print pointer PP is set to the lead address of the text memory 41 in step S71, and the address data indicated by the print pointer PP are read in step S72. If the code data indicated by the print pointer value PP is then, in step S73, determined as character code, the magnification rate is determined according to the set size data, outline data are magnified according to the magnification rate, print data (dot data formed according to the magnified outline data) are formed and is stored in the print buffer 46 in step S74. The print data stored in the print buffer 46 is output to the print mechanism PM in step S75 where printing operations are performed. Refer to Japanese Laid-open Patent Publication No. 49-129447 for more detailed explanation of processes for converting outline data to dot data using the magnification rate. One is added to the print pointer value PP in step S76, and when code data exists in the text memory 41 (i.e., step S77 is "yes") steps S72 et seq are repeated.

When the code data are the start code (i.e., step S73 is "no" and step S79 is "yes"), the stored bar code data, from the next address to the end code inclusive, are read in step S80 and, using the previously mentioned bar code data conversion process, converted into standard version bar code data in step S81 based on the 13 digit data character data. The print data for the bar code are formed in step S82 based on the standard version bar code data so the size of the bar symbols are printed as set. The print data are output in step S83 to the print mechanism PM where printing operations are performed. Next, the end code address is set in the print pointer value PP in step S84 and steps S76 and on are executed.

When the read code data are neither a character code nor a start code and, for example, are a space code (i.e., steps S72, S73 and S79 are "no"), the command corresponding to the code data Is output to the printing mechanism PM in step S85 and the program proceeds to step S76.

When print processes have been executed for all the data in the text memory 41 (i.e., step S77 is "no"), a drive signal for feeding a predetermined amount of tape is output to tape feed motor and a command to execute cutting operations is output in step S78, after which the print processing control subroutine ends and the program returns to step S11.

Figure 17:
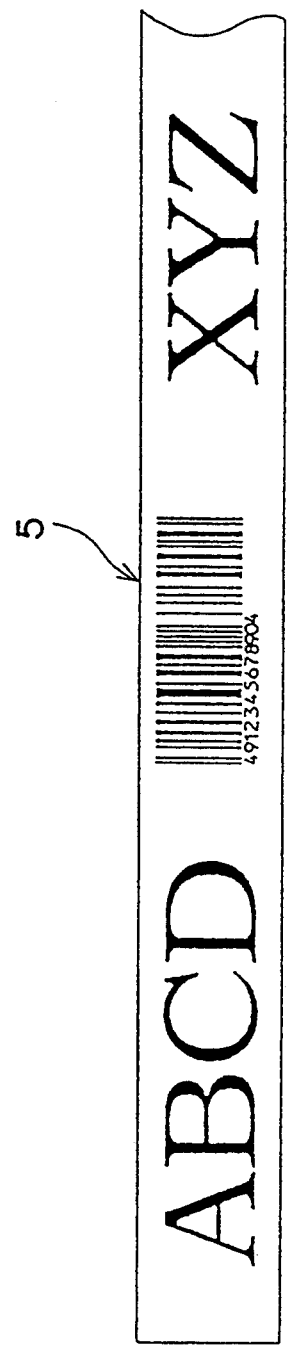
FIG. 17 is a schematic diagram showing an example tape printed as per the present invention with both character strings and a bar code.

At this point, when data is stored in the text memory, for example as shown in FIG. 11, undergo printing operations, a standard version bar code will be printed out simultaneously with the character strings "ABCD" and "XYZ" as shown in FIG. 17. It is noted that the bar code is printed out with a height the same as the height of the character strings.

The bar code data conversion process can be structured to convert the 13 digit character data into reduced version bar code data as well as into standard version bar code data. Conversion is performed into the standard version or the reduced version depending on the number of characters in the character data, that is, many characters would take up much space and so require using the reduced version. Because this data are then converted into dot pattern data for printing, two types of bar code can be printed simultaneously with the character strings.

As explained above, input data for characters or signals and for bar codes are stored in the text memory 41, the code data and bar code data are converted into dot pattern data for printing and the appropriate characters and bar codes printed out accordingly so that no separate printer is needed for printing character strings. That is, bar codes and related optional character strings can be printed simultaneously, simplifying management of a variety of products, and increasing the flexibility of bar codes.

Additionally, because the bar code data are stored as bar code start codes, bar code data character data, and bar code end codes, data character data stored between the bar code start code and the bar code end code are effectively separated from other data, allowing sure conversion of only data relating to bar codes into dot pattern data for printing bar codes.

In the present invention there is no need for recording character or signal code data or bar code data in the same order as input. Special code data can be inserted to indicate the position of bar code data (i.e., to indicate presence of bar code data after this special code data). Also bar code data can be stored in a separate memory.

By providing a delete key in place of the backspace key, deleting characters at the position of the cursor is possible. Inputting at least bar code data as data character data is possible. Also converting bar code data based on bar code standards other than JAN such as CODE 39 and EAN (European Article Number) is possible. The present invention is applicable to various types of bar code printers by providing dot print type print heads.

What is claimed is:

1. A printer for printing bar codes and characters on a tape, the printer comprising:
   input means for sequentially inputting data in a desired order, the data including character data and bar code data;
   storage means for sequentially storing the character data and the bar code data sequentially input by said input means;
   display means for displaying the bar code data using a predetermined mark in a proper position with respect to the character data based on the desired order;
   reading means for sequentially reading the character data and the bar code data stored in said storage means, wherein the reading means reads the character data and the bar code data in the desired order;
   converting means for converting the character data and the bar code data read from said storage means by the reading means into dot pattern data; and
   printing means for printing the dot pattern data on the tape in the desired order.

2. The printer of claim 1, wherein said converting means comprises translating means for translating the bar code data into translated bar code data based on a character contained in the character data, and said converting means converting the translated bar code data into the dot pattern data.

3. The printer of claim 1, further comprising receiving means for receiving a print tape cassette, the print tape cassette containing the tape, and wherein the printing means prints the dot pattern data on the tape.

4. The printer of claim 1, wherein said predetermined mark comprises a start mark and an end mark, the start mark corresponding to the bar code start data and the end mark corresponding to the bar code end data.

5. The printer of claim 2, wherein the translating means translates the bar code data into a standard version.

6. The printer of claim 2, wherein the translating means translates the bar code data into a reduced version.

7. The printer of claim 1, further comprising:
determining means for determining a data type of the data input to the input means; and
flagging means for flagging the bar code data with bar code start data and bar code end data based on the data type determined by the determining means, the bar code start data representing a start of the bar code and the bar code end data representing an end of the bar code.

8. The printer of claim 1, wherein the predetermined mark comprises at least a start mark, the start mark corresponding to bar code start data.

9. The printer of claim 1, wherein the predetermined mark comprises at least an end mark, the end mark corresponding to bar code end data.

10. The printer of claim 1, wherein during input of the bar code data, said display means displays a start mark as the predetermined mark followed by the input bar code data.

11. The printer of claim 10, wherein the bar code data comprises a series of digit characters.

12. The printer of claim 10, wherein when input of the bar code data is complete, said display means is cleared.

13. The printer of claim 12, further comprising display change-over means for clearing said display means when the bar code data is complete and subsequently causes said display means to display the input character data and bar code data in the desired order, the bar code data represented by the predetermined mark.

14. The printer of claim 1, further comprising deletion means for selectively deleting input character data and bar code data.

15. The printer of claim 14, wherein said deletion means comprises a key that deletes a data element shown on said display means in a position immediately to the left of a cursor.

16. The printer of claim 14, wherein using said deletion means to delete the predetermined mark also erases all associated bar code data.

17. The printer of claim 16, wherein the predetermined mark comprises a start mark and an end mark and deleting either of the start mark and the end mark using the deletion means erases the associated bar code data.

18. A method of using a printer for carrying out printing of bar codes and characters on a tape, the method comprising the steps of:
sequentially inputting data in a desired order, the data including character data and bar code data;
sequentially storing the sequentially input character data and bar code data;
displaying the bar code data using a predetermined mark in a proper position with respect to the character data based on the desired order;
sequentially reading the character data and the bar code data stored during the sequentially storing step, wherein the character data and the bar code data are read in the desired order;
converting the read character data and bar code data into dot pattern data; and
printing the dot pattern data on the tape in the desired order.

19. The method of claim 18, wherein said converting means comprises a step of translating the bar code data into translated bar code data based on a character contained in the character data, and said converting step is comprised of converting the translated bar code data into the dot pattern data.

20. The method of claim 18, further comprising the step of inserting a print tape cassette into the printer, the print tape cassette containing the tape, wherein the dot pattern data is printed on the tape during the printing step.

21. The method of claim 18, wherein the predetermined mark comprises a start mark and an end mark, the start mark corresponding to the bar code start data and the end mark corresponding to the bar code end data.

22. The method of claim 19, wherein the translating step translates the bar code data into a standard version.

23. The method of claim 19, wherein the translating step translates the bar code data into a reduced version.

24. The method of claim 18, further comprising the steps of:
determining a data type of the data input during the sequentially inputting data step; and
flagging the bar code data with bar code start data and bar code end data based on the data type determined in the determining step, the bar code start data representing a start of the bar code and the bar code end data representing an end of the bar code.

25. The method of claim 18, wherein the predetermined mark comprises at least a start mark, the start mark corresponding to bar code start data.

26. The method of claim 18, wherein the predetermined mark comprises at least an end mark, the end mark corresponding to bar code end data.

27. The method of claim 18, wherein during the sequentially inputting data step of inputting the bar code data, the displaying step causes the display of a start mark as the predetermined mark followed by the input bar code data on a display.

28. The method of claim 27, wherein the bar code data comprises a series of digit characters.

29. The method of claim 27, wherein when inputting of the bar code data is complete, further comprising the step of clearing the display means.

30. The method of claim 29, further comprising a display change-over step for clearing the display means when inputting the bar code data is complete and subsequently causing the display means to display the input character data and bar code data in the desired order, the bar code data represented by the predetermined mark.

31. The method of claim 18, further comprising the step of selectively deleting input character data and bar code data.

32. The method of claim 31, wherein said selectively deleting step comprises deleting a data element shown on the display means in a position immediately to the left of a cursor.

33. The method of claim 14, wherein executing the selectively deleting step to delete the predetermined mark also includes a step of erasing all associated bar code data.

34. The method of claim 33, wherein the predetermined mark comprises a start mark and an end mark and said step of selectively deleting either of the start mark and the end mark includes said step of erasing the associated bar code data.

* * * * *